(12) United States Patent
Perry

(10) Patent No.: US 8,722,276 B2
(45) Date of Patent: May 13, 2014

(54) MULTIPLE TRANSITION FLOW FIELD AND METHOD

(75) Inventor: Michael L. Perry, Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 124 days.

(21) Appl. No.: 13/143,796

(22) PCT Filed: Jan. 8, 2009

(86) PCT No.: PCT/US2009/000086
§ 371 (c)(1),
(2), (4) Date: Jul. 8, 2011

(87) PCT Pub. No.: WO2010/080080
PCT Pub. Date: Jul. 15, 2010

(65) Prior Publication Data
US 2011/0269055 A1  Nov. 3, 2011

(51) Int. Cl.
*H01M 8/04* (2006.01)
(52) U.S. Cl.
USPC .......................................... 429/480; 429/514
(58) Field of Classification Search
USPC ................................................. 429/480, 514
See application file for complete search history.

(56) References Cited

U.S. PATENT DOCUMENTS

| | | |
|---|---|---|
| 5,641,586 A | 6/1997 | Wilson |
| 6,472,095 B2 | 10/2002 | Margiott |
| 6,485,857 B2 | 11/2002 | Perry et al. |
| 6,682,835 B2 | 1/2004 | Breault |
| 6,686,084 B2 | 2/2004 | Issacci et al. |
| 6,780,533 B2 | 8/2004 | Yi et al. |
| 6,869,709 B2 | 3/2005 | Shimotori et al. |
| 2002/0106546 A1 | 8/2002 | Perry et al. |
| 2003/0224239 A1 | 12/2003 | Carlstrom |
| 2005/0014048 A1 | 1/2005 | Yang et al. |
| 2007/0105000 A1 | 5/2007 | Chapman et al. |
| 2007/0178355 A1* | 8/2007 | Tighe et al. ..................... 429/38 |
| 2008/0124591 A1 | 5/2008 | Darling et al. |
| 2009/0004522 A1* | 1/2009 | Rock et al. ....................... 429/26 |
| 2012/0183881 A1* | 7/2012 | Sugita et al. ................. 429/482 |

FOREIGN PATENT DOCUMENTS

WO  2005012197 A2  12/2005

OTHER PUBLICATIONS

The PCT International Preliminary Report mailed Jul. 21, 2011 for International Application No. PCT/US2009/00086.

* cited by examiner

*Primary Examiner* — Mark F Huff
*Assistant Examiner* — Monique Wills
(74) *Attorney, Agent, or Firm* — Kinney & Lange, P.A.

(57) ABSTRACT

A reactant flow field (19, 21) has multiple flow field channels (30, 32) and chambers (34). The multiple flow field channels (30, 32) and chambers (34) require reactant entering the flow field (19, 21) to traverse a flow transition (38) multiple times before exiting the flow field (19, 21).

3 Claims, 5 Drawing Sheets

MULTIPLE TRANSITION FLOW FIELD AND METHOD

BACKGROUND

The present invention relates in general to the management of a reactant in a fuel cell, and more particularly, to a flow field and method which optimizes reactant flow to electrodes in a fuel cell, such as a proton-exchange membrane fuel cell.

Fuel cell power plants are well known for converting chemical energy into usable electrical power, and have applications ranging from stationary power plants to automotive vehicles. Fuel cells typically include an electrolyte, which can be a liquid (e.g., phosphoric acid), a membrane (e.g., a proton exchange membrane) or a solid (e.g., a ceramic oxygen ion conductor), that is sandwiched between an anode electrode and a cathode electrode to form a cell assembly. The electrodes commonly contain a catalyst to promote the desired reactions. During operation, reactants are continuously supplied to the electrodes.

For example, in a proton-exchange membrane fuel cell the cell assembly is called a membrane-electrode assembly. On either side of the membrane electrode assembly are gas diffusion layers in contact with bipolar plates that comprise reactant flow fields for supplying a reactant fuel (e.g., hydrogen) to the anode, and a reactant oxidant (e.g., oxygen or air) to the cathode, the reactants diffusing through the gas diffusion layers to be evenly distributed on the anode or cathode catalyst layers. The hydrogen electrochemically reacts with the anode catalyst layer of the proton exchange membrane to produce positively charged hydrogen protons and negatively charged electrons. The electrolyte membrane only allows the hydrogen protons to transfer through to the cathode side of the membrane, forcing the electrons to follow an external path through a circuit to power a load before being conducted to the cathode catalyst layer. When the hydrogen protons and electrons eventually come together at the cathode catalyst layer, they combine with the oxidant to produce water and thermal energy. During operation of the fuel cell, the reactants (e.g., hydrogen, oxygen) are supplied to the electrode catalyst layers and the water produced at the cathode is removed from the fuel cell.

SUMMARY

Exemplary embodiments of the present invention include a reactant flow field having multiple flow field channels and chambers. The multiple flow field channels and chambers require reactant entering the flow field to traverse a flow transition multiple times before exiting the flow field.

Additional embodiments include a fuel cell having a gas diffusion layer and a flow field plate. The flow field plate includes a reactant inlet and outlet and flow field chambers. Reactant flows from the inlet to the outlet via the gas diffusion layer and flow field chambers.

Further embodiments include a method for flowing reactant through a fuel cell and a method of operating a fuel cell. The methods include delivering reactant to a first flow field channel and flowing the reactant from the first flow field channel to a second flow field channel via an array of flow field channels and a gas diffusion layer.

DETAILED DESCRIPTION

Figure 1:
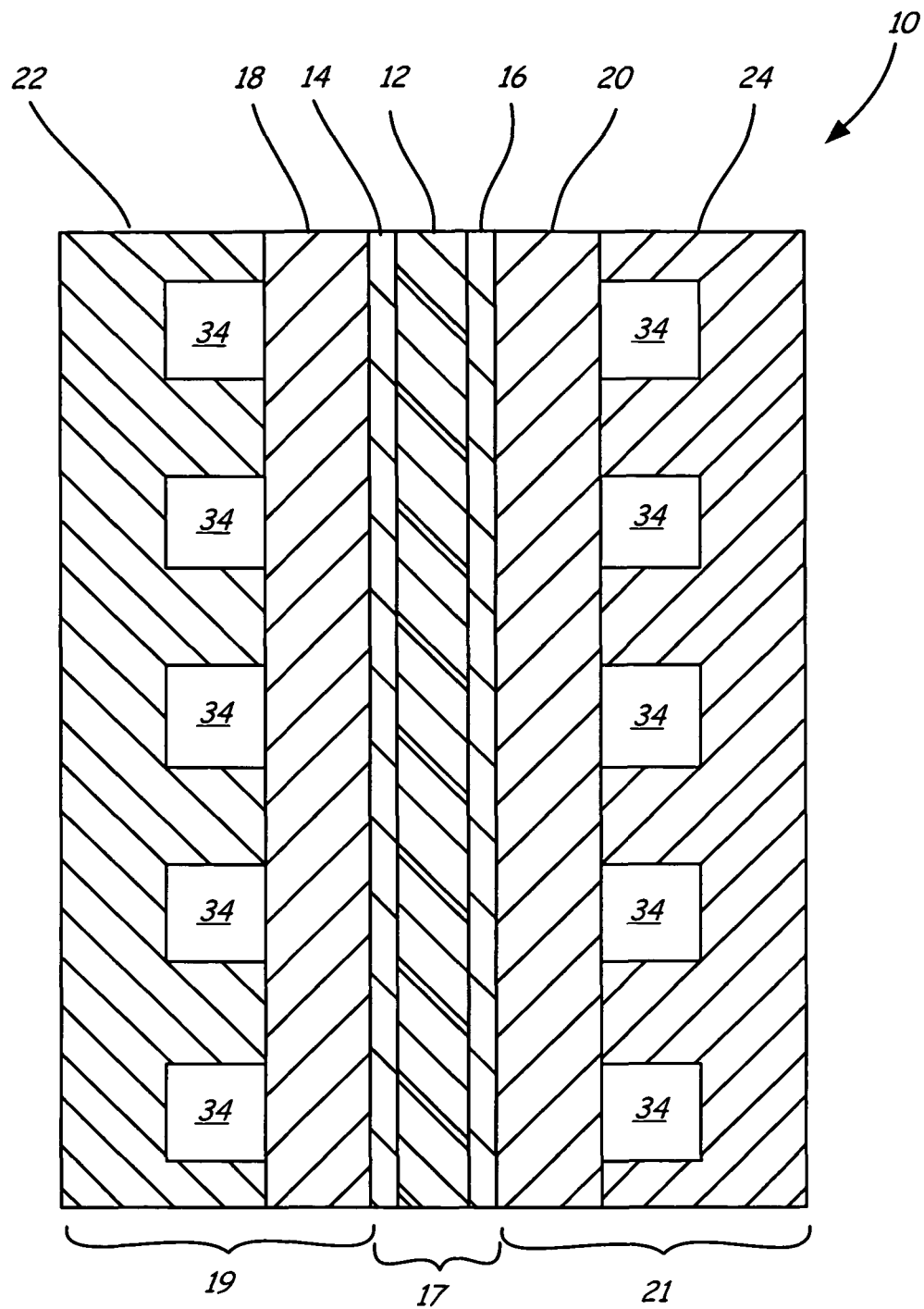
FIG. 1 is a cross section view of a proton exchange membrane fuel cell.

FIG. 1 illustrates a cross section view of one embodiment of proton exchange membrane fuel cell 10. Fuel cell 10 includes polymer electrolyte membrane ("PEM") 12, anode electrode 14, cathode electrode 16, gas diffusion layers 18, 20 and flow field plates 22, 24. Anode electrode 14 and cathode electrode 16 are located on opposite sides of PEM 12 and commonly contain catalysts such as platinum. Together, anode electrode 14, PEM 12 and cathode electrode 16 make up membrane electrode assembly ("MEA") 17. Gas diffusion layer ("GDL") 18 is adjacent anode electrode 14 and allows reactant fuel (e.g., hydrogen) to reach anode electrode 14. GDL 20 is adjacent cathode electrode 16 and allows reactant oxidant (e.g., oxygen) to reach cathode electrode 16. GDL 20 also allows product water, formed at cathode electrode 16, to migrate toward flow field plate 24. Flow field plates 22 and 24 are located adjacent GDLs 18 and 20, respectively. Together, flow field plate 22 and GDL 18 make up fuel flow field 19. Flow field plate 24 and GDL 20 make up oxidant flow field 21. Fuel flow field plate 22 directs reactant fuel to anode electrode 14. Oxidant flow field plate 24 directs reactant oxidant to cathode electrode 16. Flow field plates 22 and 24 also direct reaction product (i.e. water) away from MEA 17 and GDLs 18, 20. FIG. 1 illustrates flow field chambers 34 of flow field plates 22 and 24. Flow field chambers 34 are described in detail below.

One method of supplying reactants to the MEA in a fuel cell includes the use of an interdigitated flow field. One example of an interdigitated flow field is described in U.S. Pat. No. 6,780,533 to Yi et al. A flow field plate is separated from the cathode or anode electrode by a GDL. The flow field plate is interdigitated and contains alternating inlet channels and outlet channels arranged in a side-by-side array and facing the GDL. A reactant is delivered to the inlet channel under pressure but cannot exit the inlet channel directly. The reactant is allowed to exit the outlet channel but cannot enter the outlet channel directly. A rib separates adjacent inlet and outlet channels and serves as a barrier between the two channels. After the reactant enters the inlet channel it transitions to the outlet channel via the GDL. The high pressure causes the reactant to exit the inlet channel and enter the GDL. Once in the GDL, the reactant is in proximity to the MEA and is free to react at an electrode (or catalyst layer). Unused reactant and reaction product (i.e. water) transitions from the GDL to the outlet channels of the flow field plate. The lower pressure in the outlet channels causes the unused reactant and water to exit the GDL and flow to the outlet channels. Unused reactant and water then exits the flow field plate via the outlet channels.

Interdigitated reactant flow fields result in forced convection of a reactant toward the electrode catalyst layers so that a greater proportion of the reactant flowing through the reactant flow fields is utilized more efficiently. However, the forced convection cannot be achieved effectively without an increase in the pressure drop across the flow field. The increased pressure drop, in turn, requires a higher pressurization of the reactant gas, thereby consuming a greater proportion of the electricity which is generated by the fuel cell, which is called parasitic power. The suitability of fuel cells for any particular utilization is at least partly dependent upon its overall efficiency, including not only the efficiency of generating the electricity, but the cost (in power) of generating that electricity. The overall efficiency of the fuel cell is of great importance, particularly in mobile equipment, such as vehicles, which not only must transport a load, and the fuel cell, but also the fuel which is to be utilized, in one form or another.

Interdigitated flow fields allow for a single pass of reactant in the fuel cell and provide low susceptibility to membrane dry-out. The high pressure drop used in interdigitated flow fields also provides for more effective delivery of reactants to the fuel cell catalyst layers than parallel field flow. However, in some fuel cell applications an even larger increase in delivery of reactant to the MEA and the ability to remove product water from the fuel cell is desired. In these applications, interdigitated flow where reactant makes a single transition between the GDL and the flow field plate is insufficient. Embodiments of the present invention provide flow fields in which a reactant transitions between the flow field plate and the GDL multiple times. In these embodiments, reactant is delivered to the GDL, and consequently the MEA, with a greater frequency than previous delivery methods.

Figure 2:
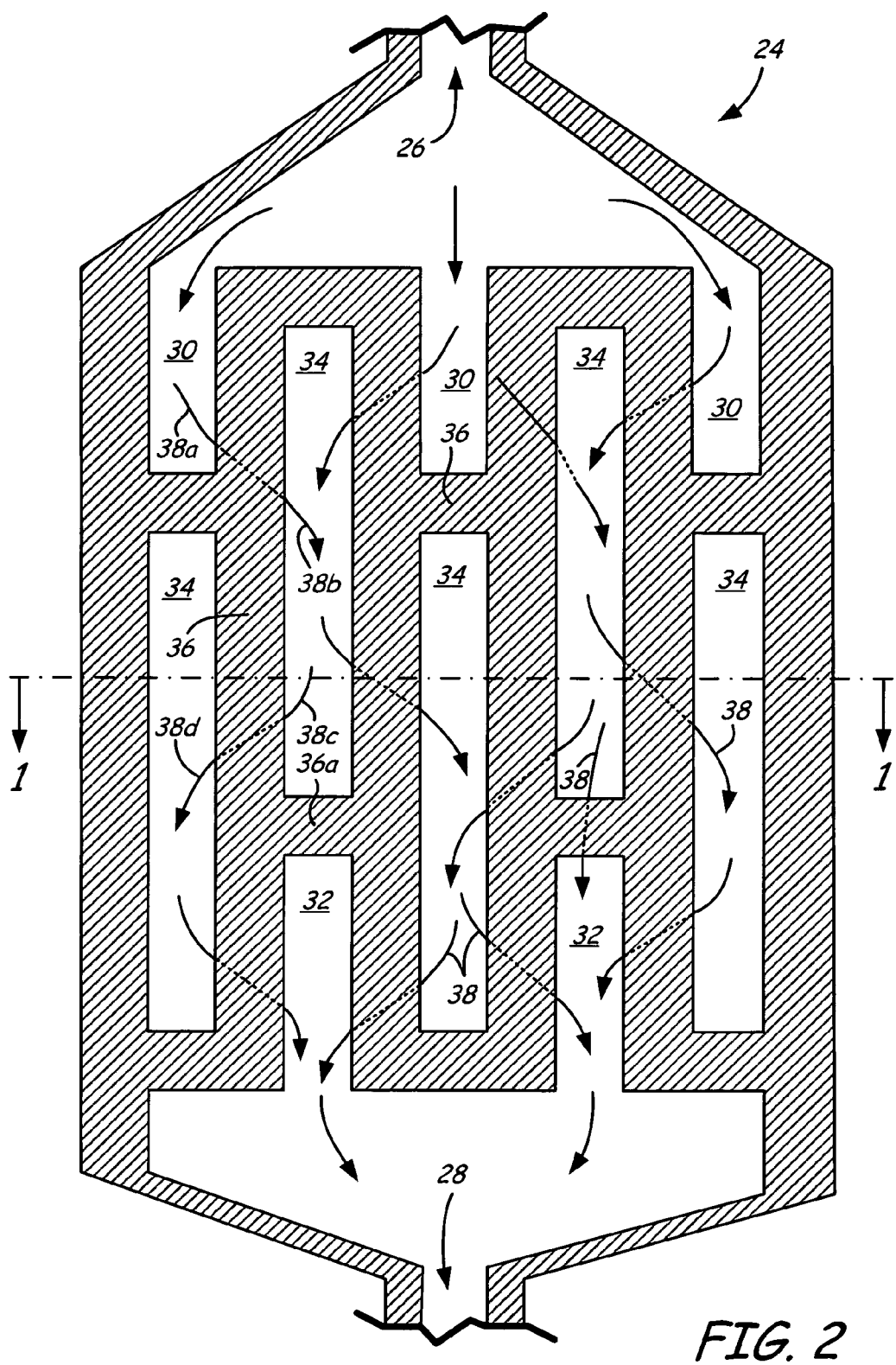
FIG. 2 is a stylized, simplified sectioned side elevation view of a multiple transition flow field plate.

FIG. 2 illustrates a cross section side view of one embodiment of flow field plate 24. Flow field plate 24 can be a fuel flow field plate or an oxidant flow field plate. For the purposes of the following description, flow field plate 24 will be referred to as an oxidant flow field plate. In one embodiment, oxidant flow field plate 24 is a metal plate. Suitable metals include, but are not limited to, stainless steel and titanium. In another embodiment, oxidant flow field plate 24 is a carbon plate. Regardless of composition, flow field plate 24 can be solid or porous. One example of a porous flow field plate is described in U.S. Pat. No. 5,700,595 to Reiser. Oxidant flow field plate 24 includes inlet 26 and outlet 28 and one or more inlet (first) channels 30, outlet (second) channels 32, flow field chambers 34 and ribs 36. Inlet 26 and inlet channels 30 receive oxidant delivered to oxidant flow field plate 24. Outlet 28 and outlet channels 32 convey oxidant and water produced at cathode electrode 16 away from oxidant flow field plate 24. Inlet channels 30, outlet channels 32, and flow field chambers 34 are separated from each other by ribs 36. In one embodiment, inlet channels 30, outlet channels 32, and flow field chambers 34 are arranged in a staggered array as shown in FIG. 2. Inlet channels 30, outlet channels 32, and flow field chambers 34 are grooves or channels located on a surface of oxidant flow field plate 24. In one embodiment, oxidant flow field plate 24 is a stamped metal plate where inlet channels 30, outlet channels 32, and flow field chambers 34 are stamped into oxidant flow field plate 24. In another embodiment, inlet channels 30, outlet channels 32, and flow field chambers 34 are machined on oxidant flow field plate 24.

As described above, oxidant flow field plate 24 is located adjacent to gas diffusion layer 20. Oxidant flow field plate 24 is positioned in fuel cell 10 so that one side of inlet channels 30, outlet channels 32, and flow field chambers 34 open towards GDL 20. Oxidant enters oxidant flow field plate 24 via inlet 26 and GDL 20 and leaves oxidant flow field plate 24 via outlet 28 and GDL 20.

Oxidant is initially delivered to oxidant flow field plate 24 via inlet 26 at elevated pressure. Oxidant flows from inlet 26 into inlet channel 30. Ribs 36 prevent oxidant from travelling directly towards outlet 28 through oxidant flow field plate 24.

As pressure within inlet channel 30 builds near ribs 36, the oxidant transitions (represented by line 38a) from inlet channel 30 of oxidant flow field plate 24 to GDL 20 (not shown in FIG. 2). The dashed portion of arrows 38 represents oxidant flow in GDL 20. Oxidant enters GDL 20 and the oxidant is free to react at cathode electrode 16. Unused oxidant transitions from GDL 20 back to oxidant flow field plate 24 at flow field chamber 34 (represented by line 38b). Oxidant enters flow field chamber 34 at an area having localized fluid pressure lower than the fluid pressure of inlet channel 30 and GDL 20 above chamber 34. The continued delivery of oxidant to inlet 26 at elevated pressure causes oxidant to flow downstream in flow field chamber 34 (i.e. toward outlet 28). As pressure within flow field chamber 34 builds near downstream rib 36a, oxidant again transitions to GDL 20 (represented by line 38c). In GDL 20, oxidant is again free to react at cathode electrode 16. Unused oxidant transitions from GDL 20 back to oxidant flow field plate 24.

Depending on the particular path taken, oxidant transitions to a different flow field chamber 34 or outlet channel 32. Different transition paths exist within oxidant flow field plate 24 as represented by arrows 38. The particular paths taken by the oxidant are determined and influenced by the width of ribs 36 and the relative fluid pressures of inlet channels 30, outlet channels 32, and flow field chambers 34. Preferential reactant paths can be designated by changing the width of a rib 36 to accommodate increased or decreased flow across a particular rib 36.

Oxidant reaches outlet channel 32 after two or more transitions to GDL 20. Thus, after the oxidant transitions between oxidant flow field plate 24 and GDL 20 at least two times, oxidant flows through outlet channel 32 and to outlet 28 for removal from oxidant flow field plate 24. As illustrated in FIG. 2, oxidant may take one of multiple paths through oxidant flow field plate 24. Regardless of which path is taken, the oxidant transitions between oxidant flow field plate 24 and GDL 20 at least two times before exiting oxidant flow field plate 24.

While reference to FIG. 2 and the description above has been made to oxidant flow field plate 24, fuel flow field plate 22 may be similarly arranged to provide multiple transition flow of reactant fuel. In the case of fuel flow field plate 22, fuel transitions between fuel flow field plate 22 and GDL 18 at least two times before exiting fuel flow field plate 22.

The number of transitions a reactant (oxidant or fuel) makes between the flow field plate and GDL is determined by the number of flow field chambers 34 between inlet channels 30 and outlet channels 32. The greater the number of flow field chambers 34, the greater the number of transitions between flow field plate. Generally, the distance (vertical dimension in FIG. 2) from inlet 26 to outlet 28 is at least about 5 cm (2.0 in) and is typically longer (e.g., approximately 30 cm (11.8 in) for automotive applications). The width (horizontal dimension in FIG. 2) of one "column" of channels and chambers extending from inlet 26 to outlet 28 (as shown in FIG. 2) is generally about 0.5 cm (0.20 in). The number of flow field chambers 34 may be increased by adding additional ribs 36 to further subdivide flow field chambers 34.

A fuel cell having oxidant flow field plate 24 as described above generally has a higher absolute pressure and a higher pressure drop than a fuel cell having conventional interdigitated flow. This higher pressure drop is desirable in particular applications. For instance, a higher pressure drop can result in more uniform flow to all of the reactant channels (30, 32 and 34), even when reactant is fed into oxidant flow field plate 24 from a small manifold (inlet 26), as illustrated in FIG. 2. Additionally, a higher pressure drop can assist with product water removal from fuel cell 10. Liquid water produced at cathode electrode 16 can block oxidant reactant access to cathode electrode 16 or cathode catalyst layers. In fuel cell applications where the cell size must be kept relatively small (e.g., in a vehicle), embodiments of the present invention allow for increased pressure drop without changing flow field plate or channel sizes. Conventional fuel cells would require increasing the size of oxidant flow field 21 or decreasing the size of the reactant channels (30, 32 and 34) in oxidant flow field plate 24.

In an embodiment in which oxidant flow field plate 24 is a solid plate, the back pressure at inlet 26 is generally between about 50 kPa and about 200 kPa above ambient pressure. In one embodiment, the back pressure at inlet 26 is between about 100 kPa and about 200 kPa above ambient pressure. The back pressure at outlet 28 is generally between about ambient pressure and about 100 kPa above ambient pressure. In one embodiment, the back pressure at outlet 28 is between about 50 kPa and about 100 kPa above ambient pressure. These back pressures generate a pressure drop between about 50 kPa and about 200 kPa.

In an embodiment in which oxidant flow field plate 24 is a porous plate, the back pressure at inlet 26 is generally between about 15 kPa and about 50 kPa above ambient pressure. The back pressure at outlet 28 is generally about 0 kPa above ambient pressure. These back pressures generate a pressure drop between about 15 kPa and about 50 kPa.

In addition to increasing the availability of reactant at MEA 17, flow field plate 24 also improves the removal of product water from fuel cell 10. The increased pressure drop created by oxidant flow field plate 24, pushes water out of fuel cell 10 at oxidant flow field plate 24 more effectively than with conventional interdigitated flow. The pressure drop from inlet 26 to outlet 28 provides a more favorable path for product water to transition from GDL 20 to oxidant flow field plate 24 flow field chambers 34 and ultimately outlet 28. Effective removal of product water from MEA 17 is necessary to achieve optimal fuel cell performance.

Figure 3:
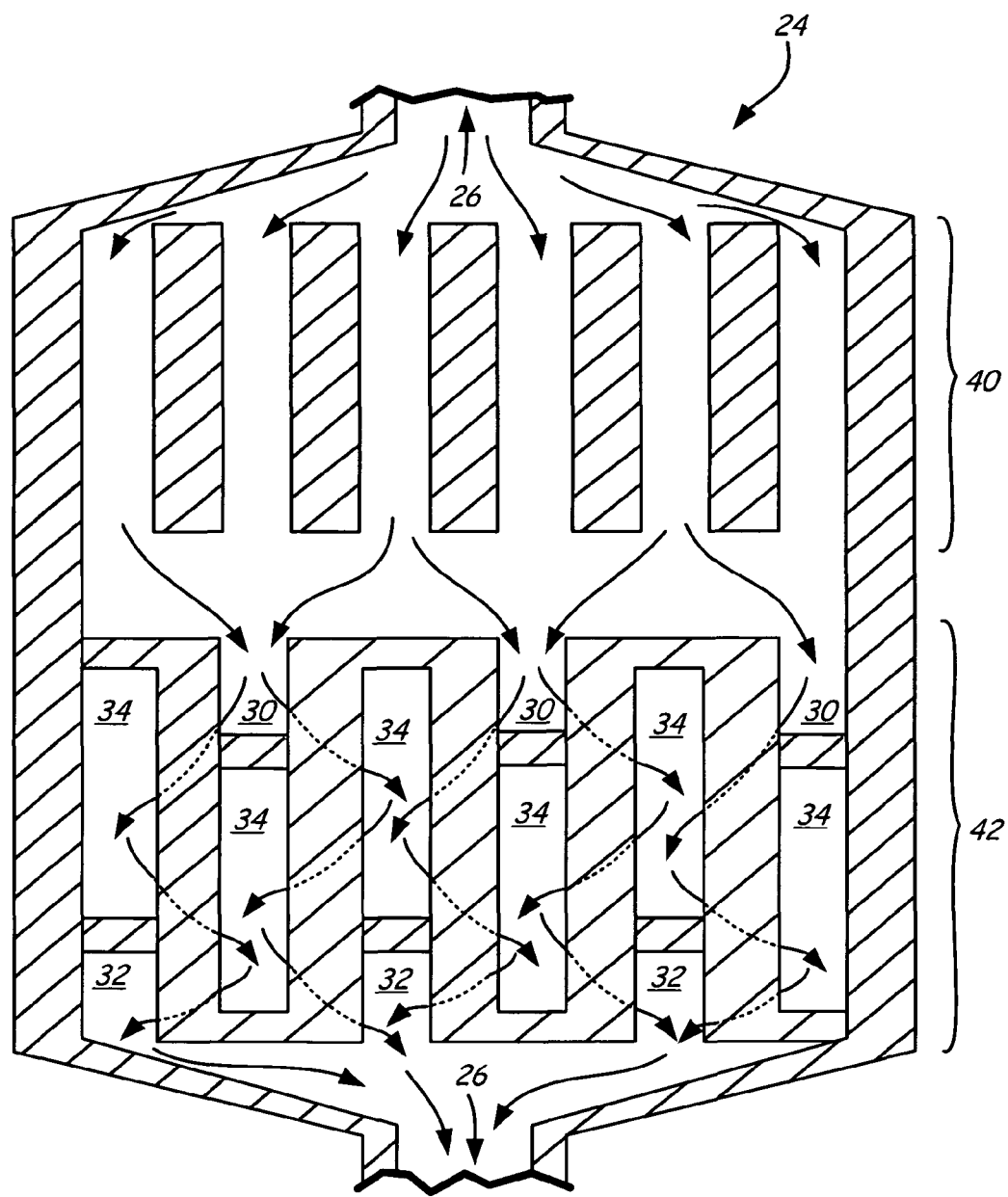
FIG. 3 is a stylized, simplified sectioned side elevation view of a hybrid flow field plate having parallel flow and multiple transition flow.
Figure 4:
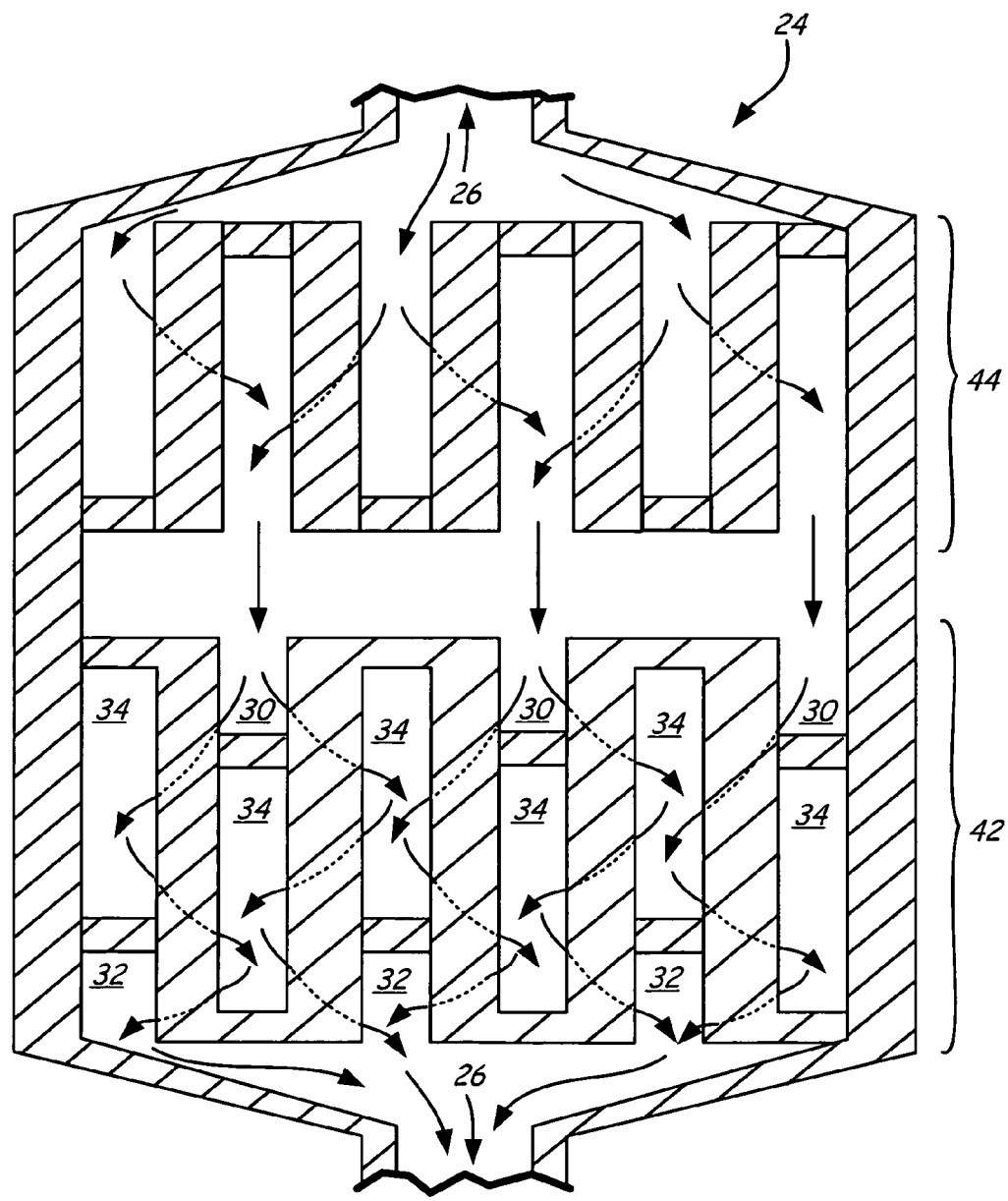
FIG. 4 is a stylized, simplified sectioned side elevation view of a hybrid flow field plate having interdigitated flow and multiple transition flow.
Figure 5:
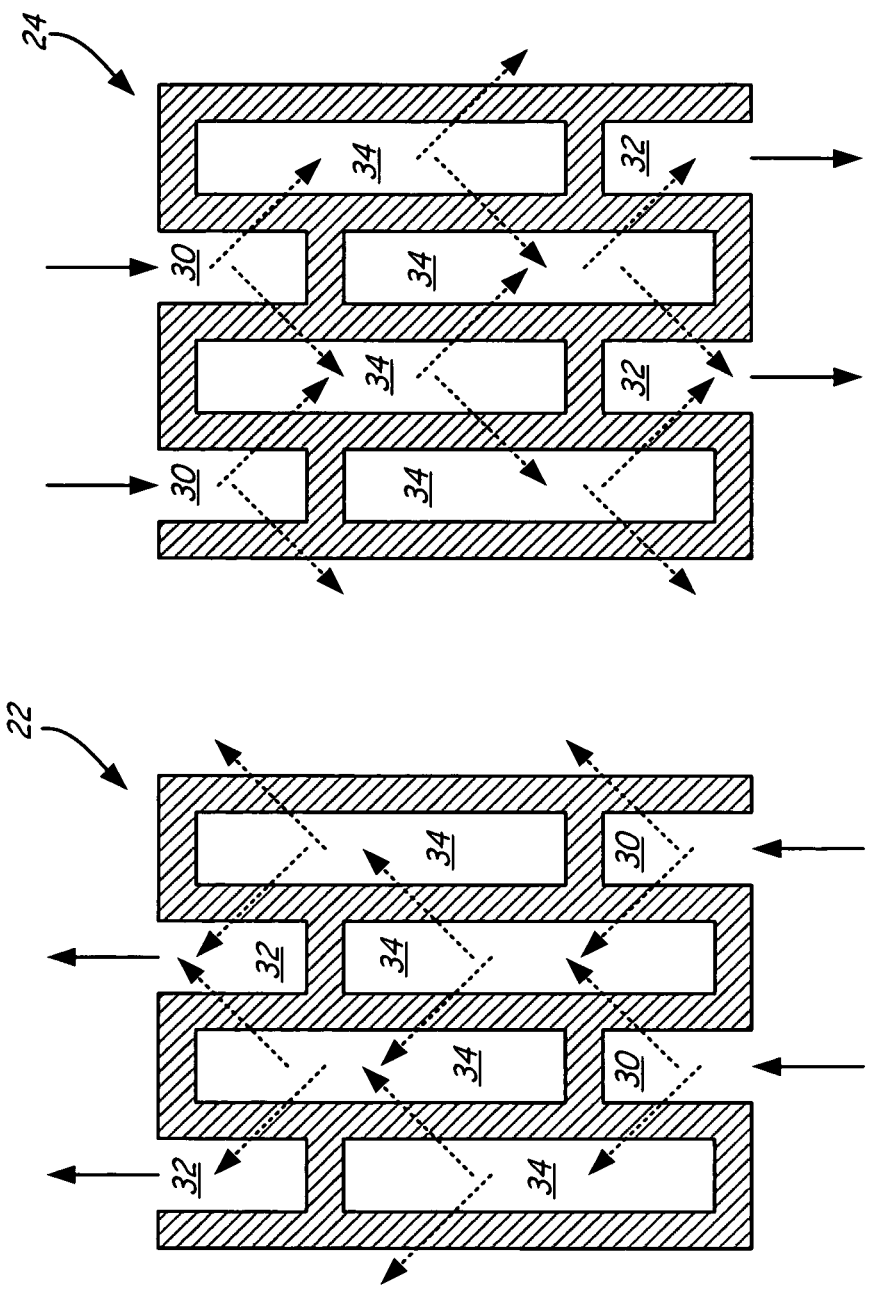
FIG. 5 is a simplified sectioned side elevation view of portions of two multiple transition flow field plates having counter flow.

Additional embodiments of flow field plates providing for multiple transitions of reactant into the GDL are illustrated in FIGS. 3 through 5. Hybrid flow field plates can be tailored to fit specific applications or specifications. FIG. 3 illustrates one embodiment where flow field plate 22, 24 includes parallel flow field section 40 and multiple transition flow field section 42. This configuration provides for slow reactant flow in parallel flow field section 40, which reduces the potential for dry-out near inlet 26 where the reactant is typically undersaturated. Additionally, the multiple transitions in multiple transition flow field section 42 help remove water from regions where product water tends to accumulate within fuel cell 10.

FIG. 4 illustrates one embodiment where flow field plate 22, 24 includes interdigitated flow field section 44 and multiple transition flow field section 42. This configuration provides the benefits of both interdigitated and multiple transition flow. Two multiple transition flow field plates can also be used in the same fuel cell on opposite sides of the MEA. FIG. 5 illustrates two multiple flow field plates 22, 24 having counter flow (indicated by arrows). Reactant fuel traversing fuel flow field plate 22 flows in the opposite direction of reactant oxidant traversing oxidant flow field plate 24.

Multiple transition flow field plates 22, 24 provide for a method of flowing reactant through a fuel cell. Reactant (oxidant or fuel) is delivered to a first flow field (inlet) channel 30 within flow field plate 22, 24. Reactant is then flowed to at least one flow field chamber 34. The reactant transitions from first flow field channel 30 to GDL 18 (fuel) or 20 (oxidant). Unused reactant transitions back to flow field plate 22, 24 to flow field chamber 34. Reactant is then flowed to a second flow field (outlet) channel 32. The reactant transitions from flow field chamber 34 to GDL 18 (fuel) or 20 (oxidant). Unused reactant transitions back to flow field plate 22, 24 to second flow field channel 32. From first flow field channel 30 to second flow field channel 32, the reactant transitions into GDL 18, 20 at least two times.

Multiple transition flow fields provide for increased delivery of reactant to the MEA. Because the reactant transitions into the GDL more frequently than in other flow regimes, the mass transport of reactant to the MEA is substantially improved. This allows for a greater rate of reaction at the MEA. In addition to the higher reactant availability at the MEA, multiple transition flow fields provide for more effective removal of product water from the MEA and GDL due to the larger pressure drop. The higher pressure drop can also provide for more uniform flow distribution to all of the reactant channels within a flow field.

While the invention has been described with reference to exemplary embodiments, it will be understood by those skilled in the art that various changes may be made and equivalents be substituted for elements thereof without departing from the scope of the invention. In addition, many modifications may be made to adapt a particular situation or material to the teachings of the invention without departing from the essential scope thereof Therefore, it is intended that the invention not be limited to the particular embodiments disclosed, but that the invention will include all embodiments falling within the scope of the appended claims.

The invention claimed is:

1. A method for flowing reactant through a fuel cell, the method comprising:
    delivering the reactant to a first flow field channel;
    flowing the reactant from the first flow field channel to at least one flow field chamber, wherein a first rib forces the reactant to traverse a gas diffusion layer to flow from the first flow field channel to the at least one flow field chamber; and
    flowing the reactant from the at least one flow field chamber to a second flow field channel, wherein a second rib forces the reactant to traverse the gas diffusion layer to flow from the at least one flow field chamber to the second flow field channel.

2. The method of claim 1 further comprising:
    flowing the reactant through a third flow field channel before delivering the reactant to the first flow field channel.

3. The method of claim 1 further comprising:
    flowing the reactant through a plurality of interdigitated flow channels before delivering the reactant to the first flow field channel, wherein the reactant traverses the gas diffusion layer once as it flows through the interdigitated flow channels.

* * * * *